(12) United States Patent
Weir

(10) Patent No.: US 11,787,146 B2
(45) Date of Patent: Oct. 17, 2023

(54) MULTILAYER PROTECTIVE COVER INCLUDING NONWOVEN MATERIAL

(71) Applicant: Industrial Packaging Supplies, Inc., Fountain Inn, SC (US)

(72) Inventor: Ronald Patrick Weir, Burlington, NC (US)

(73) Assignee: Industrial Packaging Supplies, Inc., Fountain Inn, SC (US)

( * ) Notice: Subject to any disclaimer, the term of this patent is extended or adjusted under 35 U.S.C. 154(b) by 68 days.

(21) Appl. No.: 16/983,236

(22) Filed: Aug. 3, 2020

(65) Prior Publication Data

US 2021/0146646 A1     May 20, 2021

Related U.S. Application Data

(62) Division of application No. 16/684,202, filed on Nov. 14, 2019, now Pat. No. 10,730,261.

(51) Int. Cl.
*B32B 5/02*     (2006.01)
*B32B 7/12*     (2006.01)
(Continued)

(52) U.S. Cl.
CPC ............... *B32B 1/02* (2013.01); *A47C 31/10* (2013.01); *A47C 31/105* (2013.01); *A47C 31/11* (2013.01);
(Continued)

(58) Field of Classification Search
CPC .... B32B 1/02; B32B 3/06; B32B 3/08; B32B 3/085; B32B 3/10; B32B 3/18; B32B 3/20; B32B 3/22; B32B 3/26; B32B 5/022; B32B 5/06; B32B 5/073; B32B 5/22; B32B 5/24; B32B 5/26; B32B 7/08; B32B 7/09; B32B 7/12; B32B 7/14; B32B 2250/05; B32B 2571/00; B32B 27/12; B32B 27/36; B32B 2262/0276; B32B 27/08; B32B 27/304; B32B 27/32; B32B 27/34; B32B 2307/558; B32B 2307/732; B32B 2553/00;
(Continued)

(56) References Cited

U.S. PATENT DOCUMENTS

| 4,868,025 | A | | 9/1989 | Strzelewicz |
| 5,380,582 | A | * | 1/1995 | Neely, Jr. ................ D04H 1/74 |
| | | | | 428/36.1 |

(Continued)

*Primary Examiner* — Patricia L. Nordmeyer
(74) *Attorney, Agent, or Firm* — Nelson Mullins Riley & Scarborough LLP

(57) ABSTRACT

Methods of making a protective cover. According to one method, a composite sheet is formed by providing a substrate formed from a nonwoven material having a puncture resistance exceeding 500 N, the substrate having a first surface and a second surface, disposing a first layer of plastic film on the substrate first surface and a second layer of plastic film on the substrate second surface. The composite sheet has a first end, a second end, a first lateral edge, a second lateral edge, and an axis extending between the first lateral edge and the second lateral edge. The method also includes folding the composite sheet about the axis to bring the first end of the composite sheet proximate the second end of the composite sheet and define a partially enclosed space having an opening proximate the first and second ends of the composite sheet.

18 Claims, 10 Drawing Sheets

(51) Int. Cl.
*B29C 65/00* (2006.01)
*B32B 5/22* (2006.01)
*B32B 1/02* (2006.01)
*A47C 31/10* (2006.01)
*A47C 31/11* (2006.01)
*B32B 5/26* (2006.01)

(52) U.S. Cl.
CPC ............ *A47C 31/113* (2013.01); *B29C 66/71* (2013.01); *B32B 5/022* (2013.01); *B32B 5/22* (2013.01); *B32B 5/26* (2013.01); *B32B 7/12* (2013.01)

(58) Field of Classification Search
CPC ....... B32B 27/40; A47C 31/10; A47C 31/105; A47C 31/11; A47C 31/113; A47C 31/116; B29C 66/71; B65D 31/04; B65D 33/02; B65D 65/10; B65D 65/24; B65D 81/03; B65D 2585/648; B65D 85/64; B65D 2585/647; A47B 97/00
See application file for complete search history.

(56) References Cited

U.S. PATENT DOCUMENTS

| | | | |
|---|---|---|---|
| 5,455,091 A * | 10/1995 | Oreglia | B32B 27/12 428/36.1 |
| 9,827,711 B2 | 11/2017 | Wetsch et al. | |
| 2003/0004478 A1 | 1/2003 | Mattsson | |
| 2005/0175805 A1 * | 8/2005 | Hild | B32B 37/153 428/36.1 |
| 2008/0187252 A1 * | 8/2008 | Dabrazzi | A45C 3/04 493/227 |
| 2018/0305049 A1 | 10/2018 | Wetsch | |

* cited by examiner

US 11,787,146 B2

MULTILAYER PROTECTIVE COVER INCLUDING NONWOVEN MATERIAL

PRIORITY CLAIM

This application is a divisional application of co-pending U.S. application Ser. No. 16/684,202, entitled "Multilayer Protective Cover Including Nonwoven Material," filed on Nov. 14, 2019, which is relied upon and incorporated by reference herein in its entirety for all purposes.

TECHNICAL FIELD

Embodiments of the present invention generally relate to the field of packaging supplies. More particularly, certain embodiments of the present invention relate to a protective cover used to protect objects from damage that may occur during transport and handling. In certain embodiments, the protective cover may have a multilayer structure including a layer of nonwoven material.

BACKGROUND

Furniture and other objects that are transported to and from various places, including between manufacturers, wholesalers, retail sellers, and customers, can be damaged during transport. For instance, such objects may be subject to abrasion from contact with other objects being transported, contact with a shipping container, truck, or trailer, or as a result of handling. Thus, it is known to provide protective coverings for objects to be transported and handled.

The foregoing discussion is intended only to illustrate various aspects of the related art in the field of the invention at the time and should not be taken as a disavowal of claim scope.

SUMMARY

Presently available protective coverings for objects during transport and handling suffer from numerous drawbacks. Among other things, such protective coverings are often rubbed through during transport, particularly where transported objects are subject to vibration, leading the objects to be abraded, dented, scratched, etc. Further, such protective coverings have little or no puncture resistance, which likewise can lead to covering failure during transport and handling. Additionally, some coverings are made on an "as-needed" basis, for example just prior to an object being wrapped in the covering (e.g., on a warehouse floor). The process of making these coverings requires the user to perform a series of steps. Such multi-step processes require additional time, waste material, and decrease productivity.

For example, it is known to provide a protective covering in a three-step process. At the first step, a thin polyethylene sheet or bag is placed over a piece of furniture, e.g., as a dust cover. At the second step, corrugated cardboard pieces are placed in one or more locations to shield against abrasion. For instance, cardboard trays may be placed on the "top" and "bottom" ends of a sofa (i.e., when the sofa is stood vertically on one end for transport). At the third step, a polyethylene sheet or bag that is thicker than the sheet or bag applied in the first step is secured over the first bag and cardboard. Again, though, this type of covering is subject to failure due to the polyethylene bags being rubbed through and because the covering lacks significant puncture resistance.

In contrast, various embodiments of the present invention provide covers for objects that have superior puncture resistance. Various embodiments also provide covers which may be "ready to use," in that a user simply needs to take a bag, wrap an object in the bag, and secure the bag (e.g., with tape or other adhesive), as opposed to having to first make the cover prior to wrapping the object. In some embodiments, a protective cover may comprise a multilayer structure having layers of plastic film disposed on either side of a layer of nonwoven material. Additionally, in some embodiments, one or more end caps, which may also be formed of a plastic film, may be disposed on one of the plastic film layers in locations such that, when the cover is placed on an object, the end cap(s) are disposed over one more portions of the object that are likely to be damaged or abraded during transport and handling.

According to one embodiment, the present invention provides a method of making a protective cover. The method comprises forming a composite sheet by providing a substrate formed from a nonwoven material, the substrate having a first surface and a second surface opposite the first surface; disposing a first layer of plastic film on the substrate first surface, wherein the first layer of plastic film has a first thickness; disposing a second layer of plastic film on the substrate second surface, wherein the second layer of plastic film has a second thickness that is greater than the first thickness; and disposing at least one plastic film end cap on an exterior surface of the second layer of plastic film, wherein the at least one plastic film end cap has a third thickness that is greater than the first and second thicknesses. The composite sheet has a first end, a second end, a first lateral edge extending between the first and the second end, a second lateral edge extending between the first end and the second end, and an axis extending between the first lateral edge and the second lateral edge. The method further comprises folding the composite sheet about the axis such that the first end of the composite sheet is proximate the second end of the composite sheet. Also, the method comprises securing the portion of the composite sheet extending between the first end and the axis to the portion of the composite sheet extending between the second end and the axis to define a partially enclosed space having an opening proximate the first and second ends of the composite sheet.

In accordance with another embodiment, the present invention provides a method of making a protective cover. The method comprises forming a composite sheet by providing a substrate formed from a nonwoven material, the substrate having a first surface and a second surface opposite the first surface, disposing a first layer of plastic film on the substrate first surface, and disposing a second layer of plastic film on the substrate second surface. The nonwoven material has a puncture resistance exceeding 500 N. The composite sheet has a first end, a second end, a first lateral edge extending between the first and the second end, a second lateral edge extending between the first end and the second end, and an axis extending between the first lateral edge and the second lateral edge. The method also comprises folding the composite sheet about the axis to bring the first end of the composite sheet proximate the second end of the composite sheet and define a partially enclosed space having an opening proximate the first and second ends of the composite sheet.

According to yet another embodiment, the present invention provides a method of making a protective cover. The method comprises forming a composite sheet by providing a substrate formed from a nonwoven material, the substrate having a first surface and a second surface opposite the first surface, disposing a first layer of plastic film on the substrate first surface such that at least a portion of the first layer of plastic film is slidable relative to the substrate first surface, and disposing a second layer of plastic film on the substrate second surface such that at least a portion of the second layer of plastic film is slidable relative to the substrate second surface. The composite sheet has a first end, a second end, a first lateral edge extending between the first and the second end, a second lateral edge extending between the first end and the second end, and an axis extending between the first lateral edge and the second lateral edge. The method also comprises folding the composite sheet about the axis to align the first end of the composite sheet with the second end of the composite sheet and define a partially enclosed space having an opening proximate the first and second ends of the composite sheet.

BRIEF DESCRIPTION OF THE DRAWINGS

Figure 1:
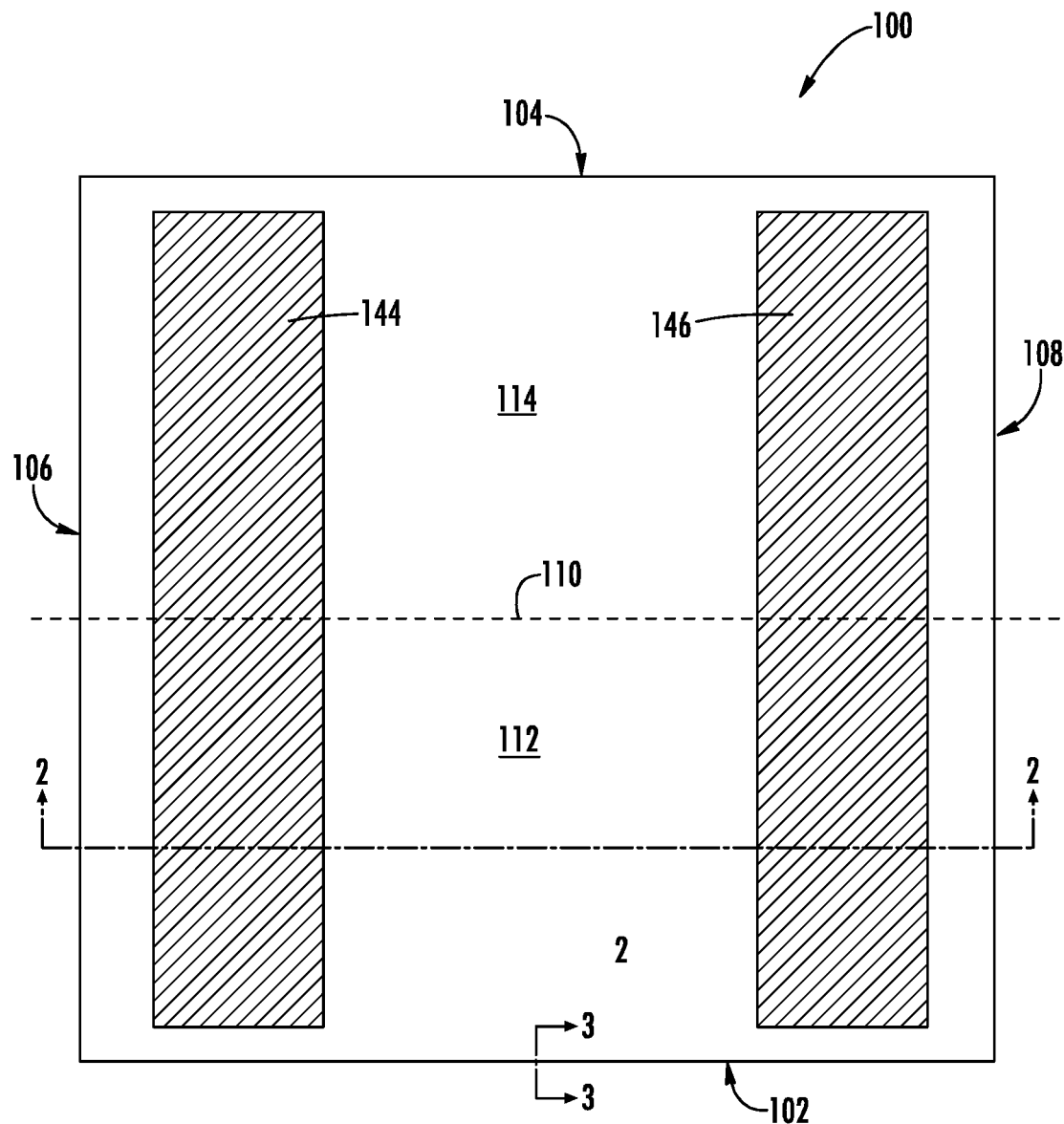
Figure 2:
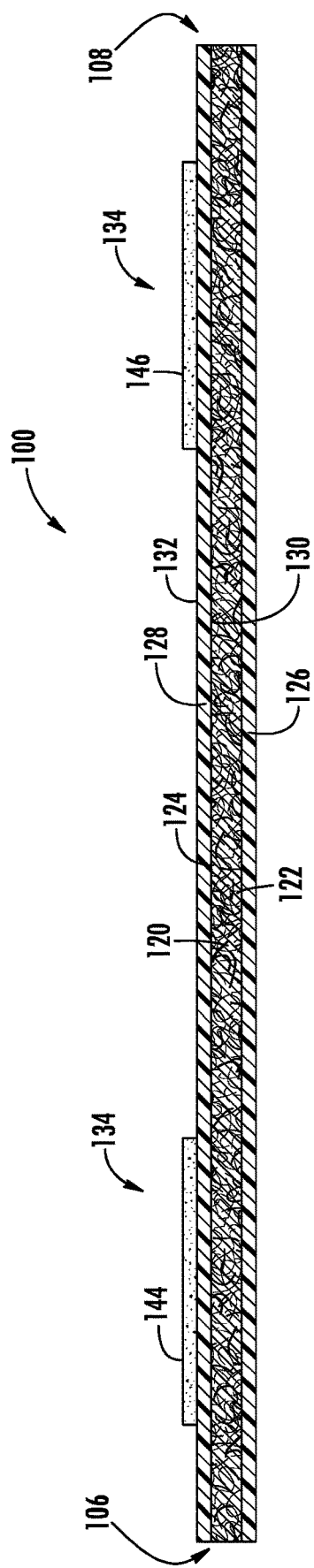
Figure 3:
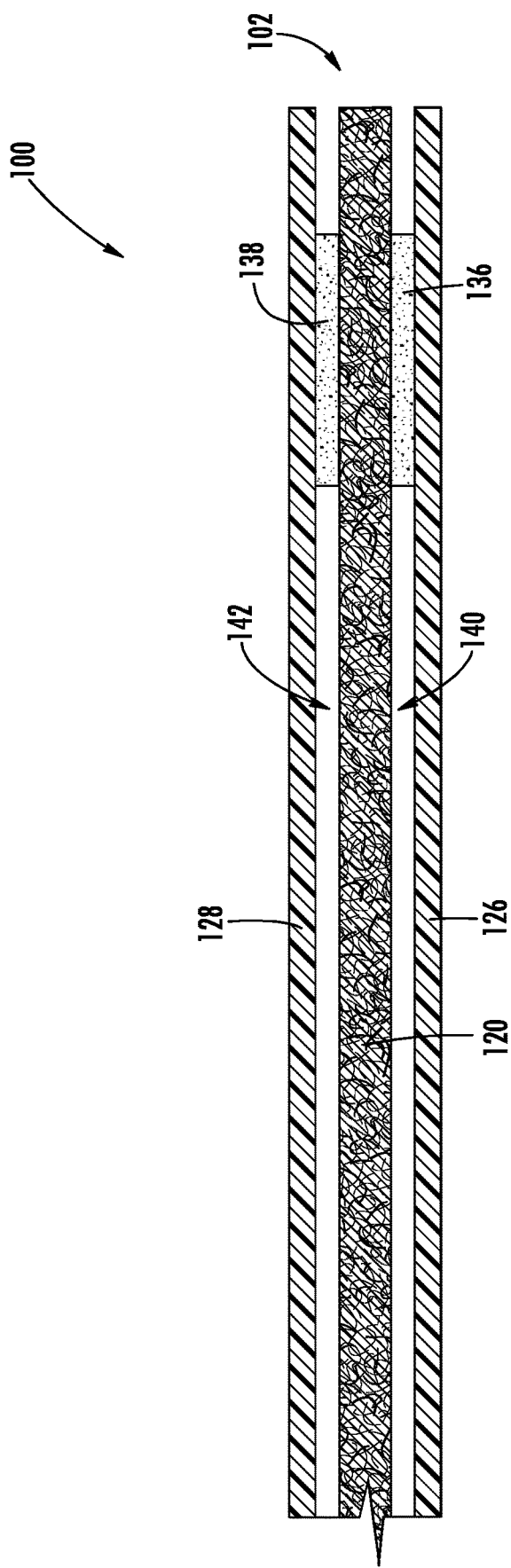
Figure 4:
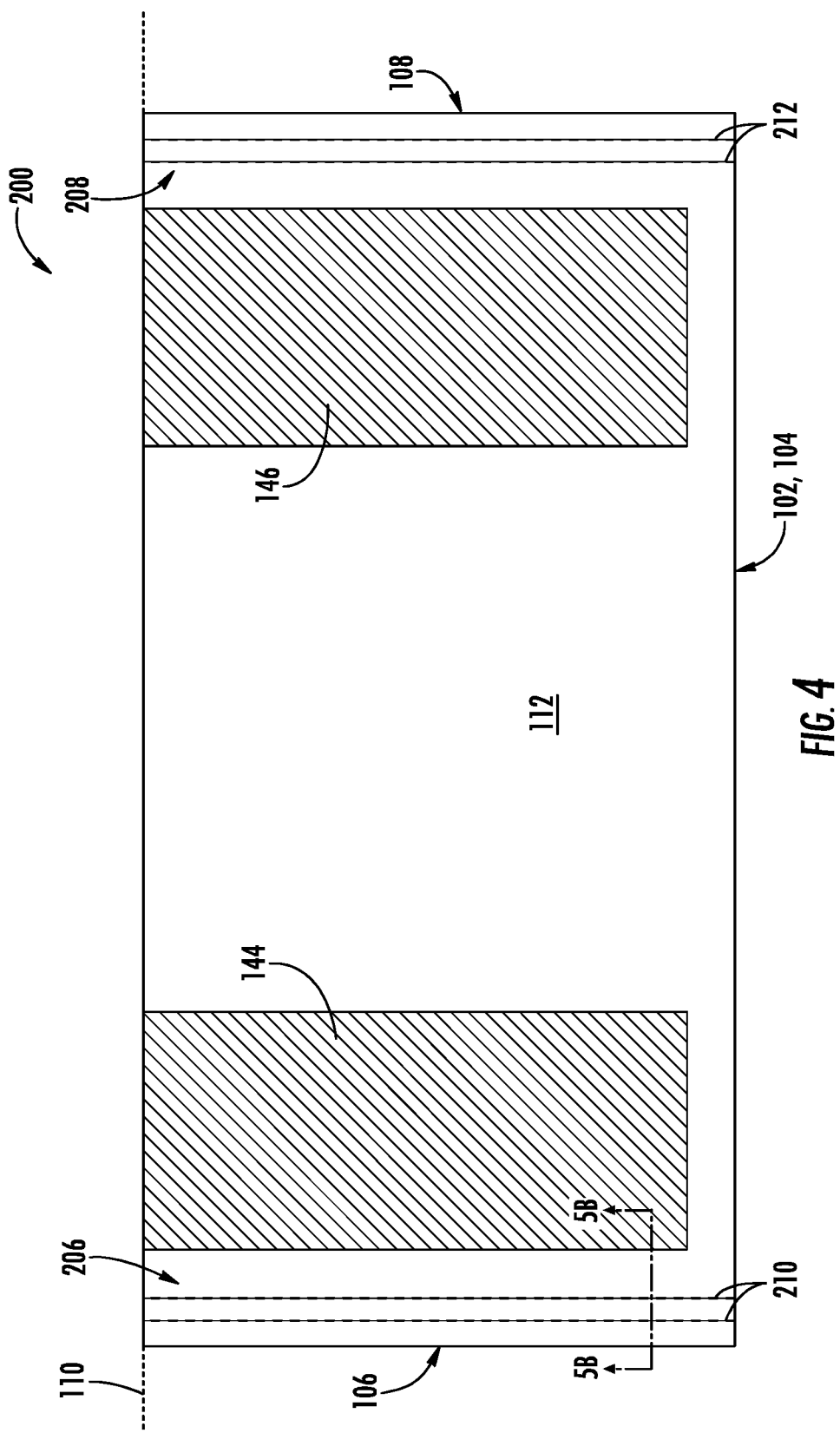
Figure 5A:
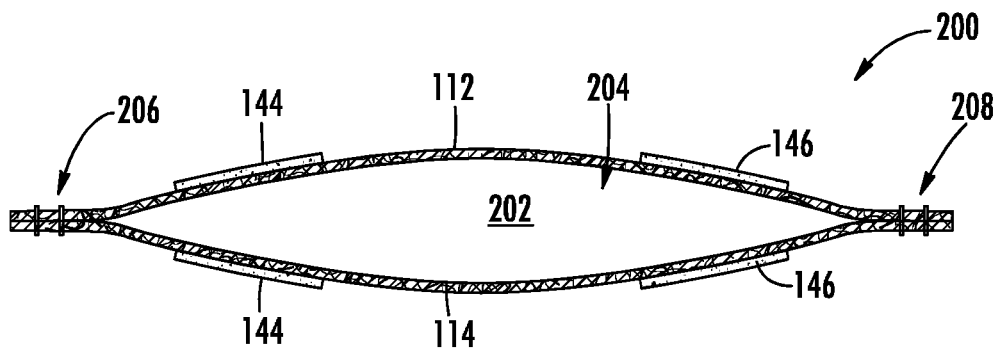
Figure 5B:
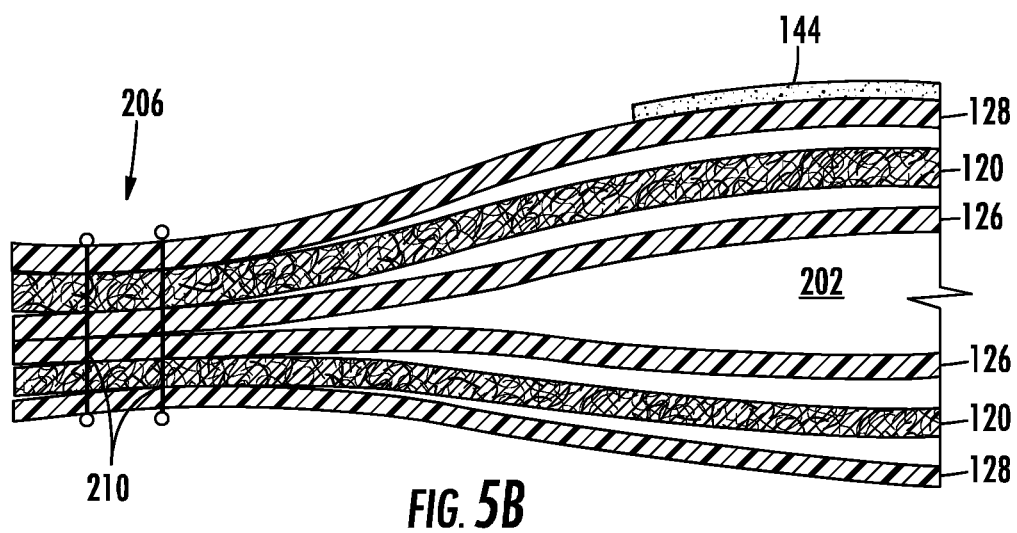
Figure 6:
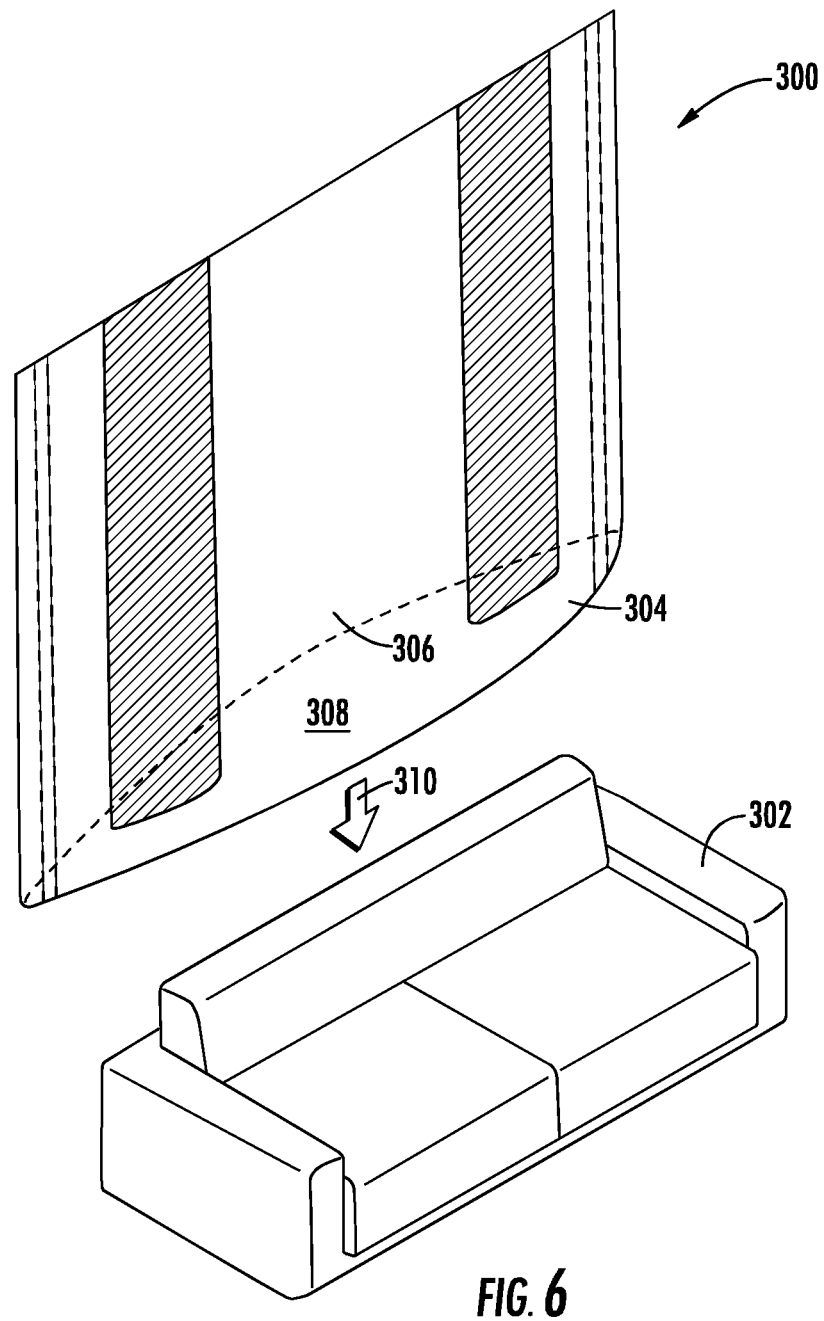
Figure 7:
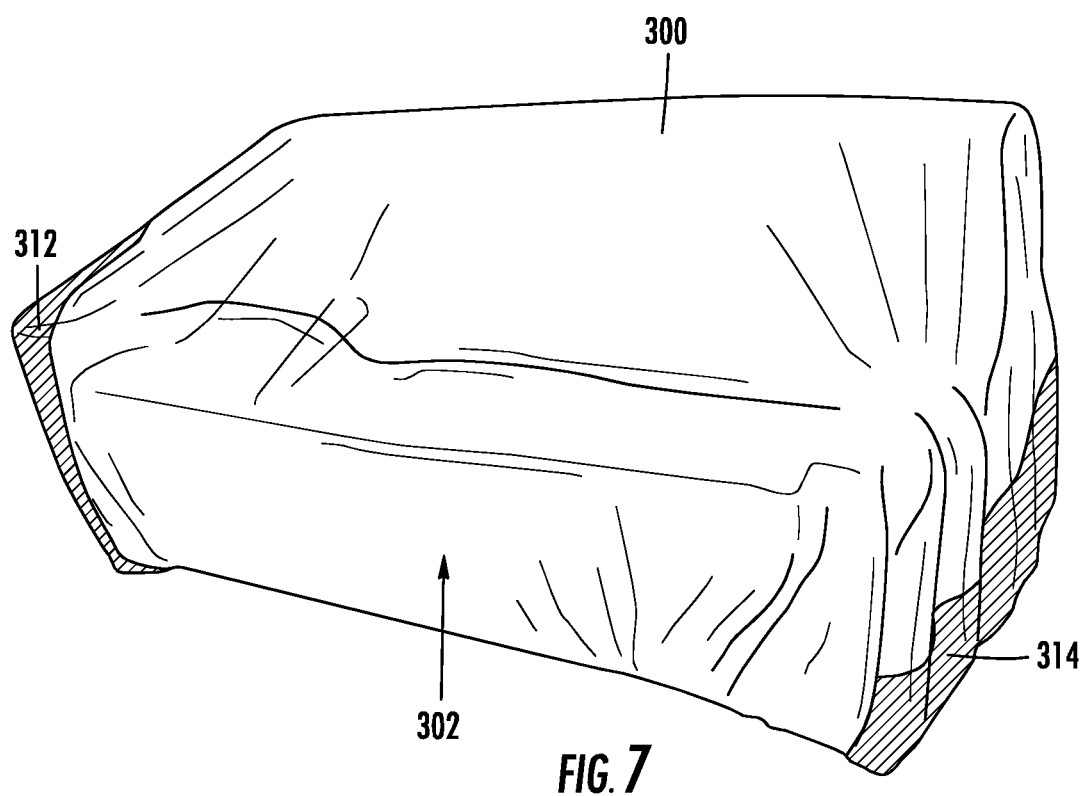
Figure 8:
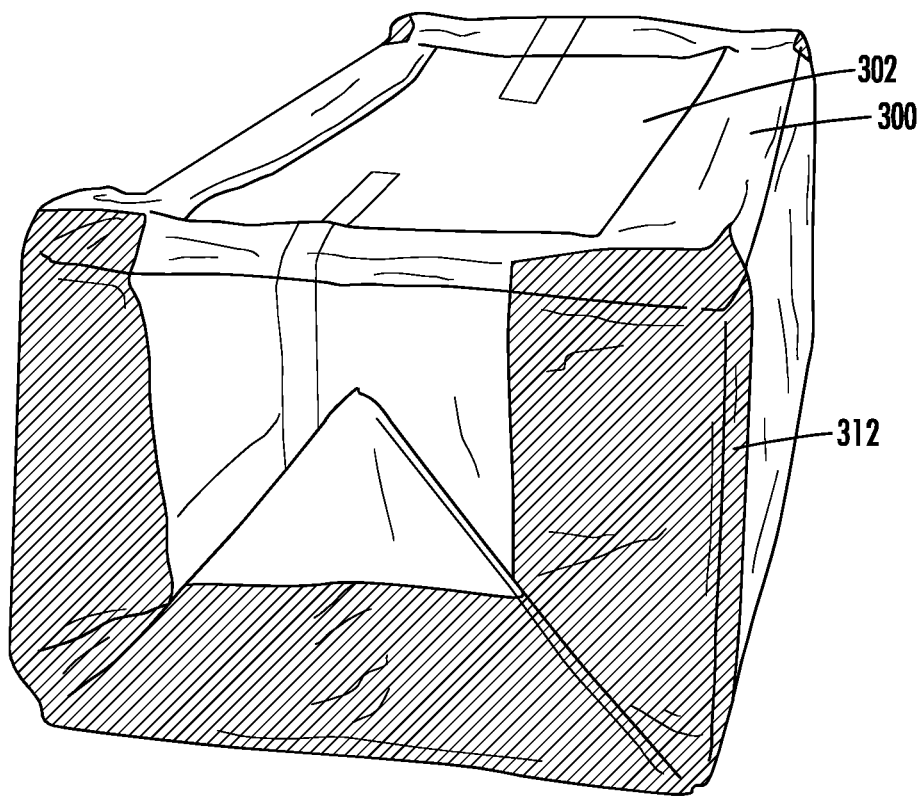
Figure 9:
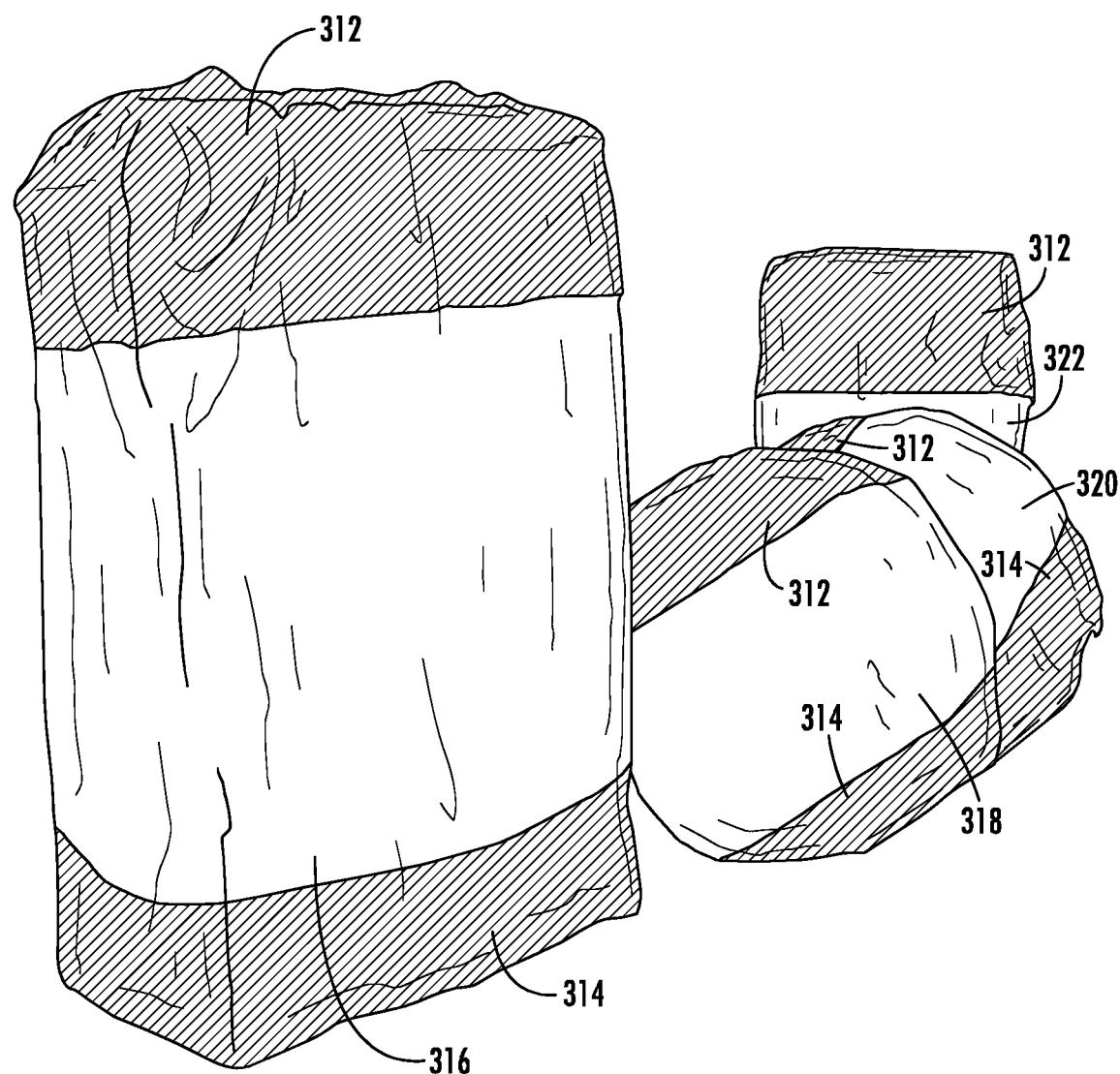
Figure 10:
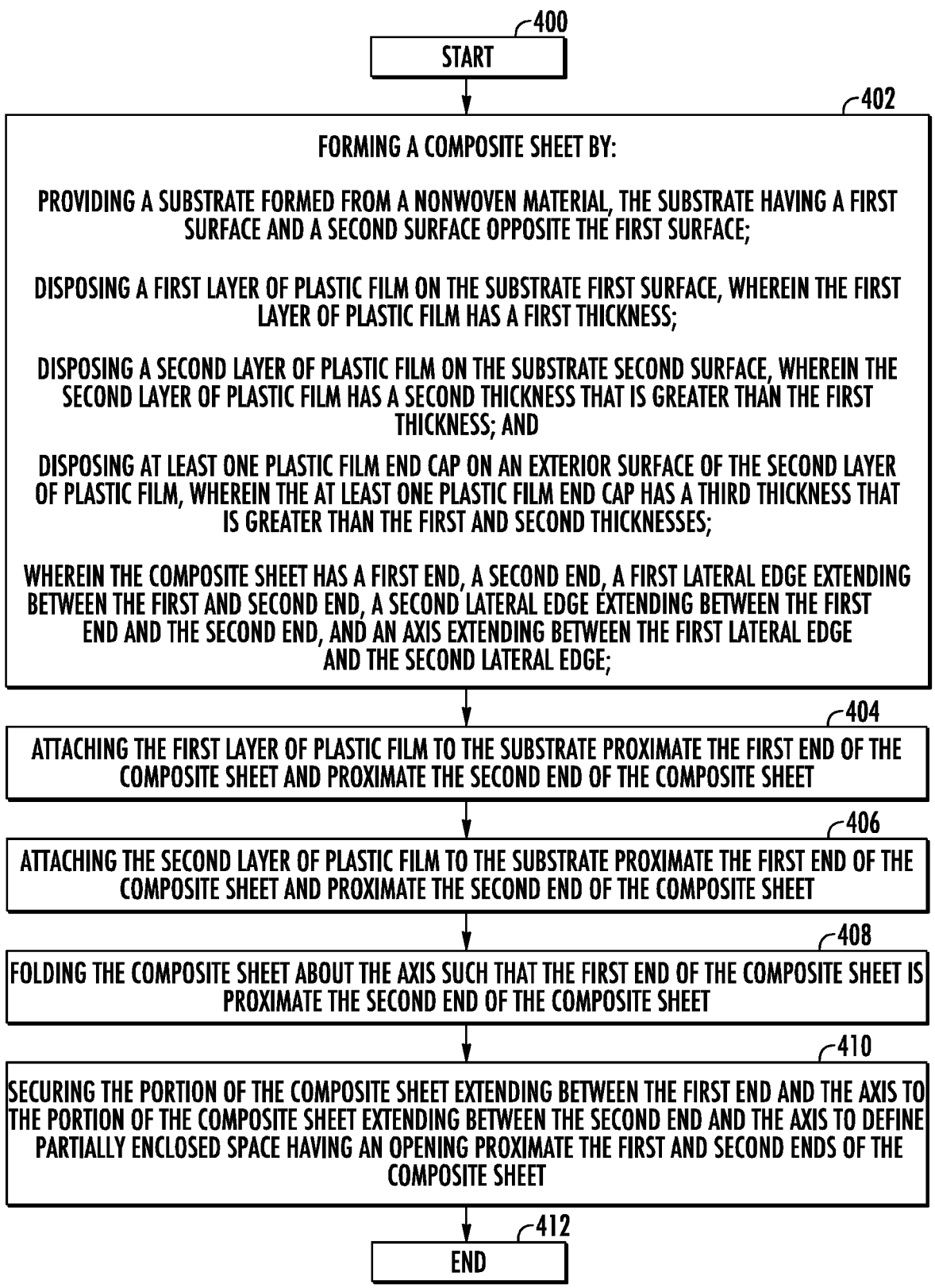

Having thus described some example embodiments in general terms, reference will now be made to the accompanying drawings, which are not necessarily drawn to scale, and wherein:

FIG. 1 is a plan view of a sheet of composite material in accordance with an embodiment of the present invention;

FIG. 2 is a cross-sectional view taken along the line 2-2 in FIG. 1;

FIG. 3 is an enlarged schematic cross-sectional view taken along the line 3-3 in FIG. 1;

FIG. 4 is a plan view of the composite sheet of FIG. 1 wherein the composite sheet has been folded about an axis according to an embodiment of the present invention;

FIG. 5A is a front elevation view of the composite sheet of FIG. 4 wherein portions of the folded composite sheet have been spaced apart relative to one another to define an opening;

FIG. 5B is an enlarged cross-sectional view taken along the line 5B-5B in FIG. 4;

FIG. 6 is a perspective view of a protective cover formed from a composite sheet in accordance with an embodiment of the present invention disposed above a piece of furniture;

FIG. 7 is a perspective view of the protective cover of FIG. 6 after it has been placed over the piece of furniture;

FIG. 8 is a perspective view of the bottom side of the protective cover of FIG. 6 after it has been placed over the piece of furniture;

FIG. 9 is a perspective view of several different objects that have been covered with a protective cover in accordance with an embodiment of the present invention; and FIG. 10 is a flow chart illustrating operations of a method of manufacturing a protective cover in accordance with an embodiment of the present invention.

Repeat use of reference characters in the present specification and drawings is intended to represent same or analogous features or elements of embodiments of the present invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of a protective cover, such as but not limited to "vertical," "horizontal," "upper," "lower," "front," or "rear," refer to directions and relative positions with respect to the cover's orientation in its normal intended operation, as indicated in the Figures herein. Thus, for instance, the terms "vertical" and "upper" refer to the vertical direction and relative upper position in the perspectives of the Figures and should be understood in that context, even with respect to an apparatus that may be disposed in a different orientation. The term "substantially," as used herein, should be interpreted as "nearly" or "close to", such as to account for design and manufacturing tolerances of the apparatus.

As used herein, the term "nonwoven" refers to textile structures produced by bonding or interlocking of fibers, or both, accomplished by mechanical, chemical, thermal, or solvent means, including combinations thereof. The term "nonwoven" as used herein does not include foams formed of plastic materials. As used herein, the term plastic film refers to a relatively thin, continuous polymeric material comprising one or more synthetic or organic polymers, including polyvinyl chloride, nylon, polyethylene, polypropylene, polyurethane, and/or polyester, having a thickness up to and including about 20 mil (0.5 mm). Plastic films as used herein may be thermoplastics, and they may comprise one or more of the foregoing polymers in various embodiments. Finally, as used herein, the terms "sheet" and "layer" can include one or more sheets or layers of material and may include one or more materials in each sheet or layer.

Turning now to FIGS. 1-3, FIG. 1 is a plan view of a sheet of composite material 100 in accordance with an embodiment of the present invention. FIG. 2 is a cross-sectional view taken along the line 2-2 in FIG. 1. FIG. 3 is an enlarged, schematic cross-sectional view taken along the line 3-3 in FIG. 1.

In the illustrated embodiment, the composite sheet 100 comprises a first end 102, a second end 104, a first lateral edge 106 extending between the first and second ends 102, 104, and a second lateral edge 108 extending between the first and second ends 102, 104. Composite sheet 100 may also comprise an axis 110 extending between the first lateral edge and the second lateral edge. In that regard, composite sheet 100 may define a first panel 112 and a second panel 114 about axis 110. First panel 112 may extend between first end 102 and axis 110 and between first lateral edge 106 and second lateral edge 108. Thus, the first and second lateral edges of panel 112 may be the respective portions of first lateral edge 106 and second lateral edge 108 that extend between first end 102 and axis 110. Second panel 114 may extend between second end 104 and axis 110 and between first lateral edge 106 and second lateral edge 108. The first and second lateral edges of panel 114 may be the respective portions of first lateral edge 106 and second lateral edge 108 that extend between second end 104 and axis 110.

As those of skill in the art will appreciate, although the composite sheet 100 is illustrated as being a quadrilateral that is rectangular in shape, this is not required in all embodiments. Rather, composite sheet 100 may be provided having any shape (e.g., circular, semi-circular, square, triangular, parallelogram, rhombus, etc.) suitable for being formed into a protective cover for an object. Additionally, in various embodiments, axis 110 need not be centered relative to first end 102 and second end 104 in various embodiments. Axis 110 may be spaced closer to end 102 in some embodiments and closer to end 104 in other embodiments. Correspondingly, first panel 112 and second panel 114 may differ in size in various embodiments, although as shown first panel 112 and second panel 114 are approximately the same size.

With specific reference to FIG. 2, in one embodiment, composite sheet 100 comprises a substrate, or layer, 120 formed of a nonwoven material. Substrate 120 comprises a first surface 122 and a second surface 124 opposite the first surface 122. Additionally, composite sheet 100 in this embodiment comprises a first layer 126 of plastic film that may be coupled with, disposed on, overlaid on, or adjoining the first surface 122 of substrate 120. Further, composite sheet 100 in this embodiment also comprises a second layer 128 of plastic film. Second layer 128 may comprise an interior surface 130 coupled with disposed on, overlaid on, or adjoining second surface 124 of substrate 120 and an exterior surface 132. In some embodiments, more than one substrate 120, first layer 126, and/or second layer 128 may be provided. As discussed in greater detail below, in various embodiments, a third layer 134 of plastic film may be coupled with, disposed on, overlaid on, or adjoining exterior surface 132 of second layer 128. In other embodiments, however, third layer 134 is not required.

Although the cross-sectional view of FIG. 2 is taken across first panel 112, in the illustrated embodiment, first panel 112 and second panel 114 are shown as being part of a single composite sheet 100, and thus each of first panel 112 and second panel 114 comprise the same multilayer structure. However, this is not required in all embodiments. Indeed, in some embodiments, first panel 112 and second panel 114 may be separate from one another until coupled together as described elsewhere herein. Additionally, in some embodiments where first and second panels 112, 114 are not separate, panels 112, 114 may have the multilayer structure described above, but composite sheet 100 may have a different structure (comprising one or more layers) around axis 110. Further, in some embodiments, each of the respective layers 120, 126, 128 in each panel 112, 114 may be formed of the same material. However, in other embodiments, one or more of the respective layers 120, 126, 128 in each panel 112, 114 may be formed of different materials, or the same material with different characteristics. For example, in various embodiments, the respective layers 120 of nonwoven material in each panel 112, 114 may be formed of the same nonwoven material or may be formed of a different nonwoven material, or the same nonwoven material but each having a different weight.

In various embodiments, the peripheral dimensions of composite sheet 100 may be selected to facilitate creation of a protective covering of desired size to cover a given type of object, as described in greater detail herein. Thus, the peripheral dimensions of composite sheet 100 will vary in various embodiments. In some example embodiments, the peripheral dimensions of composite sheet 100 may be about 110" (along lateral edges 106, 108) by 80" (along first and second ends 102, 104); about 110" (along lateral edges 106, 108) by 100" (along first and second ends 102, 104); about 110" (along lateral edges 106, 108) by 120" (along first and second ends 102, 104); about 110" (along lateral edges 106, 108) by 140" (along first and second ends 102, 104); or about 110" (along lateral edges 106, 108) by 160" (along first and second ends 102, 104).

Although as shown in FIGS. 1-3 layers 120, 126, and 128 may be the same size, or have the same peripheral dimensions or area, that is not required in all embodiments. In addition to small differences in sizing that may occur as a result of tolerances during manufacturing, it is also specifically contemplated that any of layers 120, 126, and 128 may have different size and/or peripheral dimensions or area than any other layer 120, 126, 128. For instance, in some embodiments, layer 120 may have smaller peripheral dimensions than layers 126, 128. In some embodiments, layer 128 may have larger peripheral dimensions than both layers 120, 126, such that layer 128 provides additional material that may be used in wrapping an object. Those of skill in the art will appreciate that all other such variations in dimensions are within the scope of the present invention.

As noted above, substrate 120 may be a nonwoven material. In some embodiments, substrate 120 provides qualities of flexibility, abrasion resistance, cushioning, and puncture resistance for composite sheet 100. In one embodiment, substrate 120 may have a puncture resistance exceeding about 500 Newtons. In some embodiments, substrate 120 may have a puncture resistance exceeding about 1000 Newtons. In still other embodiments, substrate 120 may have a puncture resistance exceeding about 1300 Newtons. In this regard, as used herein, the term puncture resistance refers to a value obtained based on testing according to ASTM D6241, AS 3706.4, or another test employing the California Bearing Ratio. Further, in various embodiments, substrate 120 may have a weight between about 4.5 oz/yd$^2$ and 11 oz/yd$^2$. In some embodiments substrate 120 may have a weight of about 5.3 oz/yd$^2$. In various embodiments, substrate 120 may have various thicknesses corresponding to the above characteristics. Those of skill in the art are familiar with and can provide nonwoven fabrics and materials having such puncture resistances and weights that are suitable for use in protective coverings for objects being transported.

For instance, in various embodiments, substrate 120 may be analogous to the DuraSpun® polyester spunbond nonwoven Type 011/180-02 offered by Johns Manville of Denver, Colo. However, those of skill in the art will appreciate that embodiments of the present invention are not limited to spunbond/spunlaid nonwovens or to nonwovens made from polyester. For example, as noted above, nonwovens within the scope of the present invention also include staple nonwovens, and they may be bonded via machine needling ("needlepunched"), melt blowing, chemical bonding, and/or thermal bonding, among other methods.

Plastic film layers 126 and 128 may comprise a variety of materials and thicknesses within the scope of the present invention. In some embodiments, plastic film layers 126, 128 may be or comprise polyethylene film, but that is not required in all embodiments. In various embodiments, plastic film layers 126, 128, may have thicknesses between about 0.5 mil and about 6 mil. In one embodiment, the first layer 126 has a first thickness, and the second layer 128 has a second thickness that is greater than the first thickness. For instance, in various embodiments, first layer 126 may have a thickness less than about 3 mil, and second layer 126 may have a thickness between about 2.5 mil and 6 mil. In one example embodiment, first layer 126 has a thickness of 1 mil, and second layer 128 has a thickness of 2.5 mil. In some embodiments, second layer 128 may be equivalent to 3 mil polyethylene film but have a thickness of 2.5 mil. In another example embodiment, first layer 126 has a thickness of 0.5 mil, and second layer 128 has a thickness of 3 mil. In still other embodiments, first layer 126 and second layer 128 may have the same thickness.

In various embodiments, first layer 126 may be considered "high slip" plastic film, such that it is less likely to abrade a covered object through contact. Further, in various embodiments, either or both surfaces of second layer 128 may be corona treated, for instance to reduce the surface energy of second layer 128 and to facilitate the process of wrapping an object in a protective covering. In that regard, where second layer 128 is corona treated, wrapping tape and other adhesives may better adhere to second layer 128. Second layer 128 may be corona treated either prior to or during manufacture of composite sheet 100. Those of ordinary skill in the art are familiar with corona-treatment processes for plastic films, including, for example, the corona treatment systems offered by Enercon Industries Corporation of Menomonee Falls, Wis.

With reference now to FIG. 3, in various embodiments first plastic film layer 126 and second plastic film layer 128 may be coupled with (e.g., sealed to) all or a portion of substrate 120. For instance, in the illustrated embodiments, plastic film layer 126 and plastic film layer 128 are sealed to substrate 120 at one or more locations proximate first end 102. (Although FIG. 3 illustrates a cross-section across first end 102, it will be appreciated that the same arrangement may be provided at second end 104 in various embodiments.) For example, sealing of first layer 126 with substrate 120 may occur via a pressure sensitive adhesive 136, and sealing of second layer 128 with substrate 120 may occur via pressure sensitive adhesive 138. Adhesives 136, 138 may extend in a thin line along the length of first end 102 (and second end 104), or it may extend along only a portion of such length. Likewise, adhesives 136, 138 may be provided in a thin continuous line or in any suitable pattern (e.g., a series of dots). Those of ordinary skill in the art are familiar with suitable adhesives for this purpose. Also, in various embodiments, either or both of layers 126, 128 may be sealed with substrate 120 using other means than adhesive, including lamination, heat sealing, and/or mechanical couplings. Further, in some embodiments, layers 126, 128 may be sealed or laminated to each other, rather than to substrate 120.

As shown, in various embodiments, adhesives 136, 138 may be disposed proximate first end 102 (and second end 104). In some embodiments, adhesives 136, 138 may be located at first end 102 (and second end 104), and in other embodiments, adhesives 136, 138 may be spaced apart from first end 102 (and second end 104). In one embodiment, adhesives 136, 138 may be spaced apart from first end 102 (and second end 104) by about 1.5", and adhesives 136, 138 may be about 2" in width, though other dimensions are contemplated.

However, in some example embodiments, first layer 126 of plastic film and second layer 128 of plastic film are not sealed to substrate 120 at any location other than proximate ends 102 and 104. Thus, for instance, first layer 126 of plastic film and second layer 128 of plastic film are not sealed to substrate 120 at either lateral edge 106, 108 (although they may be secured to substrate 120 at or proximate these locations after a covering is formed from composite sheet 100, as described in more detail below). As a result, each of first layer 126 and second layer 128 may define at least a portion of each layer that is slidable relative to substrate 120 first surface 122 and second surface 124, respectively. In other words, at least the portions of each of first layer 126 and 128 that extend between the seals 136, 138 located proximate each end 102, 104 are movable relative to their corresponding facing surfaces of substrate 120, rather than being laminated or otherwise sealed thereto. This is shown schematically in the enlarged cross-sectional view of FIG. 3, wherein a semi-enclosed space 140 is defined between substrate 120 and first layer 126, and a semi-enclosed space 142 is defined between substrate 120 and second layer 128.

In various embodiments, having portions of first layer 126 and/or second layer 128 be "loose" or movable with respect to substrate 120 is advantageous. For instance, it has been found that this structure, when formed into a protective covering in accordance with embodiments of the invention, provides padding and puncture resistance while also preventing abrasion of an object being transported. Correspondingly, where at least portions of these three layers can move relative to one another, it has been found that there is less likelihood that one or more of the layers are rubbed through, particularly where the covered object is subject to vibration during transport.

Referring again to FIGS. 1-2, as noted above, in some embodiments a third layer 134 of plastic film may be coupled with exterior surface 132 of second layer 128. In various embodiments, third layer 134 may define or comprise one or more plastic film end caps 144, 146. As described herein, end caps 144, 146 may be used to further protect an object from damage and/or abrasion during transport. Thus, for example, end caps 144, 146 may be coupled with second layer 128 in locations selected such that, when composite sheet 100 is formed into a protective cover, and the cover is placed over an object, the end caps 144, 146 are disposed over portion(s) of the object that are most likely to be damaged during transport of the object.

Thus, depending on the type of object to be covered, and its characteristics and dimensions, the number and placement of end caps 144, 146 may vary in various embodiments. For example, in some embodiments, only one end cap 144, 146 may be provided on one of panels 112, 114, or across axis 110. In other embodiments, three or more end caps could be provided. In some embodiments, rather than spanning portions of both panels 112, 114, each end cap 144, 146 may be entirely on one respective panel 112, 114. Thus, end caps 144, 146 may have longitudinal axes that are parallel with first end 102 and second end 104 in some embodiments. The dimensions of and material selected for each end cap 144, 146 on a single composite sheet 100 could also vary.

In the illustrated embodiment, end caps 144, 146 have longitudinal axes that extend parallel with first and second ends 106, 108, and they partially cover both panels 112, 114. Again, the size of third layer 134 (and of end caps 144, 146) may vary in various embodiments, but in the illustrated embodiment end caps 144, 146 may have smaller peripheral dimensions than second layer 128. In particular, for a composite sheet having peripheral dimensions of 110" (along first and second lateral edges 106, 108) by 80" (along first and second ends 102, 104), each end cap 144, 146 may be about 103" in length (along first lateral edge 106 and second lateral edge 108) and 24" in width (along first end 102 and second end 104). Further, each end cap 144, 146 may be spaced apart from first lateral edge 106 and second lateral edge 108 by about 10" and may be spaced apart from first end 102 and second end 104 by about 3.5". Although end caps 144, 146 are shown positioned such that they are spaced apart from first end 102, second end 104, first lateral edge 106, and second lateral edge 108, in some embodiments, end caps 144, 146 may extend up to or beyond any or all of first end 102, second end 104, first lateral edge 106, and second lateral edge 108.

Third layer 134 of plastic film may comprise a variety of materials and thicknesses within the scope of the present invention. In some embodiments, plastic film layer 134 may be or comprise polyethylene film, but that is not required in all embodiments. Further, in various embodiments, third layer 134 may have a thickness (or equivalent thickness) between about 2 mil and 20 mil. Among other things, for example, third layer 134 may be formed from polyethylene terephalate, polyurethane, and/or other plastic materials. In some example embodiments, third layer 134 may be analogous to surface protection tape having a thickness of about 12 mil. In other example embodiments, third layer 134 may comprise fiberglass laminated with a plastic film. Further, in some example embodiments, third layer 134 may be analogous to protective films for electronic displays and the like. In still other embodiments, third layer 134 need not be a plastic film layer at all. In one embodiment, the third layer 134 may have a third thickness that is greater than the thicknesses of first layer 126 and second layer 128. In one embodiment, third layer 134 may have a thickness equivalent to 18 mil polyethylene film.

Third layer 134 may be coupled with second layer 128 in a variety of ways known to those of skill in the art. In one embodiment, third layer 134 is completely or partially laminated to second layer 128. In other embodiments, third layer 134 may be coupled with second layer 128 via a suitable adhesive and/or a mechanical coupling. In contrast to the arrangement of first layer 126 and second layer 128 relative to substrate 120 in some embodiments, it is contemplated that in some embodiments third layer 134 may not be slidable or movable relative to second layer 128. Of course, in still other embodiments, it is possible that only certain portions of third layer 134 may be coupled with second layer 128, such as portions of third layer 134 proximate its periphery.

Turning now to FIGS. 4-5B, in various embodiments, composite sheet 100 may be formed into a protective cover for an object, such as but not limited to furniture, that is to be transported and handled. In this regard, FIG. 4 is a plan view of composite sheet 100 wherein the composite sheet 100 has been folded about axis 110 according to an embodiment of the present invention. FIG. 5A is a front elevation view of the composite sheet of FIG. 4 wherein portions of the folded composite sheet have been spaced apart relative to one another to define an opening. FIG. 5B is an enlarged cross-sectional view taken along the line 5B-5B in FIG. 4.

More particularly, and as best seen in FIG. 4, in one embodiment, composite sheet 100 may be folded about axis 110 such that first end 102 is aligned with second end 104. Likewise, the respective first and second lateral edges 106, 108 of the first and second panels 112, 114 may be in alignment. As noted above, in other embodiments, axis 110 may not be centered between ends 102, 104, and thus folding composite sheet 100 about axis 110 in such embodiments may result in ends 102, 104 being proximate, but not necessarily aligned. Likewise, depending on the orientation of axis 110 and the shape of composite sheet 100, after folding about axis 110, the respective first and second lateral edges 106, 108 of first and second panels 112, 114 may not be in alignment in all embodiments. In still other embodiments, as noted above, panels 112, 114 of composite sheet 100 may be separate in some embodiments, and as such, panels 112, 114 may be placed into alignment without any folding being required. In any case, and as described in more detail below, composite sheet 100 may be formed into a protective cover 200.

In this regard, to form protective cover 200 in one embodiment, after composite sheet 100 has been folded about axis 110, first panel 112 may be secured to second panel 114 (hidden in FIG. 4) in order to define a partially enclosed space 202 having an opening 204 (see FIGS. 5A-5B) proximate the first and second ends 102, 104 of the composite sheet 100. As shown, a first coupling 206 is located proximate the respective first lateral edges 106 of panels 112, 114, and a second coupling 208 is located proximate the respective second lateral edges 108 of panels 112, 114.

First and second couplings 206, 208 may be any suitable coupling familiar to those of skill in the art. For instance, in various embodiments, lamination, heat sealing, adhesives, and tapes are all contemplated. In one example embodiment, first and second couplings 206, 208 may comprise respective stitching 210, 212. In particular, first panel 112 may be sewed to second panel 114 at first and second couplings 206, 208. Where first and second couplings 206, 208 comprise stitching 210, 212, those of skill in the art are familiar with and can select suitable yarn or thread and a suitable pattern for the applications discussed herein. In one embodiment, the thread used for stitching 210, 212 may comprise spun polyester or spun PET fibers.

As best seen in FIGS. 5A-5B, the stitching 210, 212 may extend through each layer 128, 120, and 126 of each panel 112, 114 in one embodiment. Further, the stitching 210, 212 may extend along the entire lateral edge 106, 108 dimensions in one embodiment, though in other embodiments, the stitching may terminate prior to ends 102, 104, or stitching may only be done intermittently. One or more rows of stitching may be provided in various embodiments; as shown, two rows of stitching are used on each side of protective cover 200.

Additionally, in various embodiments, first and second couplings 206, 208 may be located at respective first lateral edge 106 and second lateral edge 108, or first and second couplings 206, 208 may be spaced apart from respective first lateral edge 106 and second lateral edge 108. The illustrated embodiment includes the latter configuration. Those of skill in the art will appreciate that spacing couplings 206, 208 apart from respective first lateral edge 106 and second lateral edge 108 may facilitate assembly of protective cover 200 in some embodiments, in that this arrangement makes it more likely that couplings 206, 208 extend through each layer 128, 120, and 126 of each panel 112, 114. This arrangement may also provide advantages in terms of strength and/or durability in some embodiments. In various embodiments, first and second couplings 206, 208 may be spaced apart from respective first lateral edge 106 and second lateral edge 108 by about 0.5" to about 2", though other distances are contemplated.

In various embodiments, the peripheral dimensions of protective cover 200 may be selected such that the defined partially enclosed space 202 may cover a given type of object, such as specific sizes or types of furniture. Thus, the peripheral dimensions of protective cover 200 will vary in various embodiments. In some example embodiments, the peripheral dimensions of protective cover 200 may be about 55" (along lateral edges 106, 108) by 80" (along first and second ends 102, 104); about 55" (along lateral edges 106, 108) by 100" (along first and second ends 102, 104); about 55" (along lateral edges 106, 108) by 120" (along first and second ends 102, 104); about 55" (along lateral edges 106, 108) by 140" (along first and second ends 102, 104); or about 55" (along lateral edges 106, 108) by 160" (along first and second ends 102, 104).

For instance, smaller protective covers 200 may be used to cover smaller pieces of furniture, such as small tables and chairs, whereas larger protective covers 200 may be used to cover love seats, sofas, and sectionals. Again, though, protective covers 200 of any size needed or desired are within the scope of the present invention. Notably, by providing pre-made protective covers 200 of various predefined sizes to personnel engaged in wrapping objects prior to transport, such personnel may readily use the smallest bag that is adequate to cover and protect a given object. This may save time and prevent wasted material. Further, in various embodiments, couplings 206, 208 may have predefined colors that correspond to the peripheral dimensions of protective cover 200. Such "color-coding" may serve as a visual indicator to personnel of the size of a given protective cover 200.

FIGS. 6-9 show protective covers in use in accordance with various embodiments of the present invention. In this regard, FIG. 6 is a perspective view of a protective cover 300 formed from a composite sheet in accordance with an embodiment of the present invention disposed above a piece of furniture, e.g., couch 302. Protective cover 300, and the composite sheet from which it is formed, may be analogous to any of the embodiments described above. FIG. 6 shows protective cover 300 before it is used to cover couch 302. The panels 304, 306 of protective cover 300 define an opening 308, and as indicated by arrow 310 in FIG. 6, to cover couch 302, a user may lower protective cover 300 over couch 302 such that couch 302 passes through opening 308 into the enclosed space between panels 304, 306. FIG. 7 is a perspective view of the protective cover 300 after it has been placed over couch 302 and secured in place, e.g., via tape or other adhesive. As shown, end caps 312, 314 are disposed in locations such that they protect opposite ends of couch 302 once protective cover is secured in place. This is because, for example, couches 302 are often stood on end during transport and handling, and the opposite ends are most likely to suffer damage or abrasion during such transport and handling. FIG. 8 is a perspective view of the bottom side of couch 302 covered with protective cover 300. As shown in FIG. 8, after protective cover 300 is placed over couch 302, protective cover 300 may not completely cover the bottom side of couch 302. Rather, a user may tape the panels 304, 306 together and to couch 302 on the bottom side thereof. FIG. 9 is a perspective view of several different objects 316, 318, 320, 322 that have been covered with protective covers 300 in accordance with an embodiment of the present invention. As shown, objects 316, 318, 320, and 322 have varying sizes, and differently-dimensioned protective covers 300 may be used to protect each object.

Additionally, embodiments of the present invention provide methods of making a protective cover. Various examples of the operations performed in accordance with embodiments of the present invention will now be provided with reference to FIG. 10.

FIG. 10 illustrates a flowchart according to example methods for manufacturing a protective cover according to an example embodiment. The operations illustrated in and described with respect to FIG. 10 may, for example, be performed by a user of the protective cover, personnel that wrap objects prior to transport, or by semi- or completely-automated machinery, either in whole or in part. In some embodiments, some operations may be performed via machinery, and other operations may be performed manually.

At operation 400, the process starts. At operation 402, a composite sheet is formed. In one embodiment the composite sheet is formed by providing a substrate formed from a nonwoven material, the substrate having a first surface and a second surface opposite the first surface; disposing a first layer of plastic film on the substrate first surface, wherein the first layer of plastic film has a first thickness; disposing a second layer of plastic film on the substrate second surface, wherein the second layer of plastic film has a second thickness that is greater than the first thickness; and disposing at least one plastic film end cap on an exterior surface of the second layer of plastic film, wherein the at least one plastic film end cap has a third thickness that is greater than the first and second thicknesses. Additionally, in this embodiment, the composite sheet has a first end, a second end, a first lateral edge extending between the first and the second end, a second lateral edge extending between the first end and the second end, and an axis extending between the first lateral edge and the second lateral edge. At operation 404, the first layer of plastic film may be attached to the substrate proximate the first end of the composite sheet and proximate the second end of the composite sheet. Similarly, at operation 406, the second layer of plastic film may be attached to the substrate proximate the first end of the composite sheet and proximate the second end of the composite sheet. In some embodiments, at least the second layer of plastic film may be corona-treated before or following operation 406.

In some embodiments, all or a portion of operations 402, 404, and/or 406 may be performed via machinery. For instance, in some embodiments, the first layer of plastic film and the second layer of plastic film may be disposed on the first and second surfaces of the substrate of nonwoven material via a roll-to-roll process. In particular, during this process, a hot melt glue gun/dispenser may provide pressure sensitive adhesive (e.g., in a thin continuous or dotted line) on certain portions of the substrate of nonwoven material, the first layer of plastic film, and/or the second layer of plastic film, and then these layers may be pressed together. As noted above, in various embodiments, the adhesive may be provided only at select locations, such that portions of the layers of plastic film are not adhered to the nonwoven substrate and are free to move with respect thereto. In various other embodiments, any method of securing the plastic film layers to the substrate of nonwoven material familiar to those of skill in the art may be used, such as lamination, heat sealing, sonic welding, friction welding, and/or mechanical fastening (such as by sewing).

At operation 408, the composite sheet may be folded about the axis such that the first end of the composite sheet is proximate the second end of the composite sheet. Then, at operation 410, the portion of the composite sheet extending between the first end and the axis may be secured to the portion of the composite sheet extending between the second end and the axis to define a partially enclosed space having an opening proximate the first and second ends of the composite sheet. As noted above, in some embodiments, operation 410 may comprise sewing one portion of the composite sheet to the other portion of the composite sheet proximate the first and second lateral edges thereof. At operation 412, the process ends.

Based on the foregoing, it will be appreciated that embodiments of the invention provide improved protective covers and methods of manufacturing protective covers.

Various embodiments provide protective covers that are abrasion and puncture resistant while also remaining flexible. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method of making a protective cover, the method comprising:
    forming a composite sheet by
        providing a substrate formed from a nonwoven material, the substrate having a first surface and a second surface opposite the first surface;
        disposing a first layer of plastic film on the substrate first surface; and
        disposing a second layer of plastic film on the substrate second surface;
        wherein the nonwoven material has a puncture resistance exceeding 500 N;
    wherein the composite sheet has a first end, a second end, a first lateral edge extending between the first and the second end, a second lateral edge extending between the first end and the second end, and an axis extending between the first lateral edge and the second lateral edge;
    folding the composite sheet about the axis to bring the first end of the composite sheet proximate the second end of the composite sheet and define a partially enclosed space having an opening proximate the first and second ends of the composite sheet.

2. The method of claim 1, wherein the second layer of plastic film is thicker than the first layer of plastic film.

3. The method of claim 1, further comprising disposing at least one third layer of plastic film on an exterior surface of the second layer of plastic film.

4. The method of claim 3, wherein the at least one third layer of plastic film comprises two discrete layers of plastic film each disposed on the exterior surface of the second layer of plastic film, and wherein the discrete layers of plastic film each define a smaller surface area than the second layer of plastic film.

5. The method of claim 1, further comprising securing the lateral edges of the portion of the composite sheet extending between the first end and the axis to the lateral edges of the portion of the composite sheet extending between the second end and the axis.

6. The method of claim 1, wherein the nonwoven material has a puncture resistance exceeding 1000 N.

7. The method of claim 1, wherein the nonwoven material comprises needlepunched polyester fibers.

8. A method of making a protective cover, the method comprising:
    forming a composite sheet by
        providing a substrate formed from a nonwoven material, the substrate having a first surface and a second surface opposite the first surface, wherein the nonwoven material has a puncture resistance exceeding 500 N;
        disposing a first layer of plastic film on the substrate first surface, wherein the first layer of plastic film has a first thickness;
        disposing a second layer of plastic film on the substrate second surface, wherein the second layer of plastic film has a second thickness that is greater than the first thickness, and wherein the second layer of plastic film has a third surface in facing opposition with the substrate second surface and a fourth surface opposite the third surface; and
        disposing at least one third layer of plastic film on the fourth surface of the second layer of plastic film, wherein the at least one third layer of plastic film has a third thickness that is greater than the first and second thicknesses, and wherein the at least one third layer of plastic film has a fifth surface in facing opposition with the fourth surface of the second layer of plastic film, the at least one third layer of plastic film defining a smaller surface area than the second layer of plastic film;
    wherein the composite sheet has a first end, a second end, a first lateral edge extending between the first and the second end, a second lateral edge extending between the first end and the second end, and an axis extending between the first lateral edge and the second lateral edge;
    folding the composite sheet about the axis such that the first end of the composite sheet is proximate the second end of the composite sheet;
    securing the portion of the composite sheet extending between the first end and the axis to the portion of the composite sheet extending between the second end and the axis to define a partially enclosed space having an opening proximate the first and second ends of the composite sheet.

9. The method of claim 8, further comprising attaching the first layer of plastic film to the substrate proximate the first end and the second end of the composite sheet.

10. The method of claim 9, wherein the attaching operation comprises applying pressure-sensitive adhesive.

11. The method of claim 8, wherein the securing operation comprises sewing the composite sheet proximate the first and second lateral edges thereof.

12. The method of claim 8, further comprising corona-treating the second layer of plastic film.

13. A method of making a protective cover, the method comprising:
    forming a composite sheet by
        providing a substrate formed from a nonwoven material, the substrate having a first surface and a second surface opposite the first surface, wherein the nonwoven material has a puncture resistance exceeding 500 N;

disposing a first layer of plastic film on the substrate first surface such that at least a portion of the first layer of plastic film is slidable relative to the substrate first surface;

disposing a second layer of plastic film on the substrate second surface such that at least a portion of the second layer of plastic film is slidable relative to the substrate second surface, wherein the second layer of plastic film has a third surface in facing opposition with the substrate second surface and a fourth surface opposite the third surface; and disposing a third layer of plastic film on the fourth surface of the second layer of plastic film, the at least one third layer of plastic film defining a smaller surface area than the second layer of plastic film, wherein the third layer of plastic film has a fifth surface in facing opposition with the fourth surface of the second layer of plastic film;

wherein the composite sheet has a first end, a second end, a first lateral edge extending between the first and the second end, a second lateral edge extending between the first end and the second end, and an axis extending between the first lateral edge and the second lateral edge;

folding the composite sheet about the axis to align the first end of the composite sheet with the second end of the composite sheet and define a partially enclosed space having an opening proximate the first and second ends of the composite sheet.

14. The method of claim 13, further comprising sewing the portion of the composite sheet extending between the first end and the axis to the portion of the composite sheet extending between the second end and the axis.

15. The method of claim 13, wherein, following the folding operation, the portion of the first layer of plastic film disposed on the portion of the composite sheet extending between the first end and the axis is in facing opposition to the portion of the first layer of plastic film disposed on the portion of the composite sheet extending between the second end and the axis.

16. The method of claim 15, wherein the first layer of plastic film has a first thickness and the second layer of plastic film has a second thickness, and wherein the first thickness is less than the second thickness.

17. The method of claim 16, wherein the third layer of plastic film has a third thickness that is greater than the first and second thicknesses.

18. The method of claim 17, wherein the third layer of plastic film is disposed on both the portion of the composite sheet extending between the first end and the axis and the portion of the composite sheet extending between the second end and the axis.

* * * * *